United States Patent
Rustogi et al.

(10) Patent No.: US 11,381,928 B2
(45) Date of Patent: Jul. 5, 2022

(54) SYSTEM AND METHOD FOR ASSIGNING A UNIQUE IDENTIFICATION TO AN ADDRESS

(71) Applicant: Delhivery Private Limited, Haryana (IN)

(72) Inventors: Kabir Rustogi, New Delhi (IN); Rahul Kumar, Haryana (IN)

(73) Assignee: Delhivery Private Limited, Gurgaon (IN)

( * ) Notice: Subject to any disclaimer, the term of this patent is extended or adjusted under 35 U.S.C. 154(b) by 0 days.

(21) Appl. No.: 17/064,679

(22) Filed: Oct. 7, 2020

(65) Prior Publication Data

US 2021/0289316 A1 Sep. 16, 2021

(30) Foreign Application Priority Data

Mar. 16, 2020 (IN) .............................. 202011011139

(51) Int. Cl.
*H04W 4/021* (2018.01)
*G06K 9/62* (2022.01)
*H04W 4/029* (2018.01)

(52) U.S. Cl.
CPC .......... *H04W 4/021* (2013.01); *G06K 9/6215* (2013.01); *H04W 4/029* (2018.02)

(58) Field of Classification Search
CPC .......................... G06F 11/2094; H04L 67/2842
USPC .............................. 379/210.02; 709/222, 217
See application file for complete search history.

(56) References Cited

U.S. PATENT DOCUMENTS

2012/0260209 A1* 10/2012 Stibel ................... G06Q 30/018
715/780
2013/0110996 A1* 5/2013 Young ................... G06F 15/177
709/222

* cited by examiner

*Primary Examiner* — Kiet M Doan
(74) *Attorney, Agent, or Firm* — Tatonetti IP

(57) ABSTRACT

Disclosures in the present invention relate to a system and method of generating and optimising unique address parameters for entities described by addresses and locations. The system in the present invention stores multiple addresses mapped with their estimated physical locations in a database. A first address is parsed and broken down into at least nationality, state, city, town, locality, sub-locality, street, landmark, building, floor number, identification number, postal code, zip code or any other address identifying parameter. Similar addresses are searched for in the list of stored addresses and their addresses and locations are matched with the address and location of the first address to generate a unique address parameter.

6 Claims, 4 Drawing Sheets

Selecting a first address data corresponding to a first unique address parameter of a first entity

Identifying a plurality of hierarchical addressing blocks from the first address data of the first entity

Selecting at least one hierarchical addressing block from the data storage module

Selecting at least one second address data corresponding to a second unique address parameter for a second entity from the list of entities corresponding to the selected addressing block

Comparing atleast portions of the first address data and the second address data to generate a similarity score

Updating the first unique parameter of the first entity based on the generated similarity score

Fig. 4

SYSTEM AND METHOD FOR ASSIGNING A UNIQUE IDENTIFICATION TO AN ADDRESS

CROSS-REFERENCE TO RELATED APPLICATIONS

This non-provisional patent applications claims the benefit of and priority to Indian Patent Application Serial No. 202011011139, filed Mar. 16, 2020, entitled "System and Method for Assigning a Unique Identification to an Address," the entire contents of which is hereby incorporated herein by reference.

FIELD OF INVENTION

Embodiments of the disclosure relate generally to the field of machine learning and data interpretation. More particularly, embodiments of the disclosure relate to a system, method and system for generating and assigning unique identification to an address.

BACKGROUND

Most of the earth's population has a poorly defined addressing system, thus having a poorly discoverable residence, property or business locations on a map. Delivery service providers, including mail delivery providers, are faced with certain challenges in situations where the discoverability of an address is an issue. Misdirected mail is a source of inefficiency to the entity sending the mail. Likewise the time and resources expended by the entity handling the mail also represent lost resources. Delivery service providers handles millions of mailpiece items in a calendar year, and the inefficiency and waste associated with misdirected mail carries significant costs.

In poorly defined and unstructured addressing systems, consumers and other participants independently identify and adopt addressing schemes according to their own convenience. Much of the addresses are written with respect to a landmark which typically lies between 50-1500 meters of the actual address location. Weakly defined or haphazardly defined postal code schemes only add to the inconvenience.

Such addressing schemes allow a significant amount of noise to creep into written addresses. Automated systems or computer assisted systems find it difficult to decode this noise and to resolve the addresses with reasonable accuracy. Differently written versions of a single address may be resolved miles apart from each other. Similarly, two different addresses, when poorly described, may cause the automated system to resolve both to a same location.

A need, therefore, arises for a method and system to determine uniqueness of written addresses among each other.

BRIEF DESCRIPTION OF THE DRAWINGS

Embodiments according to the claimed subject matter are described below with reference to the drawings. The detailed description references the accompanying figures. The same numbers can be used throughout the drawings to reference like features and components. As used herein, like terms refer to like elements throughout the description. It should be noted that views of exemplary embodiments are merely to illustrate selected features of the embodiment. The views qualitatively illustrate exemplary features of some embodiments and, therefore, should not be interpreted as being drawn to scale.

FIG. 4 illustrates a unique identification generation system, according to one embodiment of the present invention.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

It is an object of the invention to provide improved methods for generating a unique identification for an address of an entity.

According to one aspect of the present invention, there is disclosed a computer system including one or more processing modules. The computer system further comprises one or more data storage modules operably coupled to the one or more processing modules. The computer system also comprises at least one memory module coupled to the one or more processing modules. The processing modules may be configured to select a first address data corresponding to an address of a first entity and a second address data corresponding to an address of a second entity; compute a first correlation between the first address data and the second address data; and update a unique address parameter corresponding to the address of the first entity.

The independent claims define the invention in various aspects. The dependent claims state selected elements of embodiments according to the invention in various aspects.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter. Other methods, apparatus and systems are also disclosed. Those skilled in the art will recognise additional features and advantages upon reading the following detailed description, and upon viewing the accompanying drawings.

DETAILED DESCRIPTION

For purposes of explanation, numerous specific details are set forth in order to provide a thorough understanding of the claimed subject matter. It may be evident, however, that the claimed subject matter may be practised without these specific details. Also, in some instances, well-known features are omitted or simplified to clarify the description of the exemplary implementations. In some other instances, well-known features or units or circuits have been shown in block diagram form in order avoid clutter due to unnecessary detailing. Reference will now be made to the drawings to describe the present invention in detail. The implementations herein are described in terms of exemplary embodiments. However, it should be appreciated that individual aspects of the implementations may be separately claimed and one or more of the features of the various embodiments may be combined.

Figure 1:
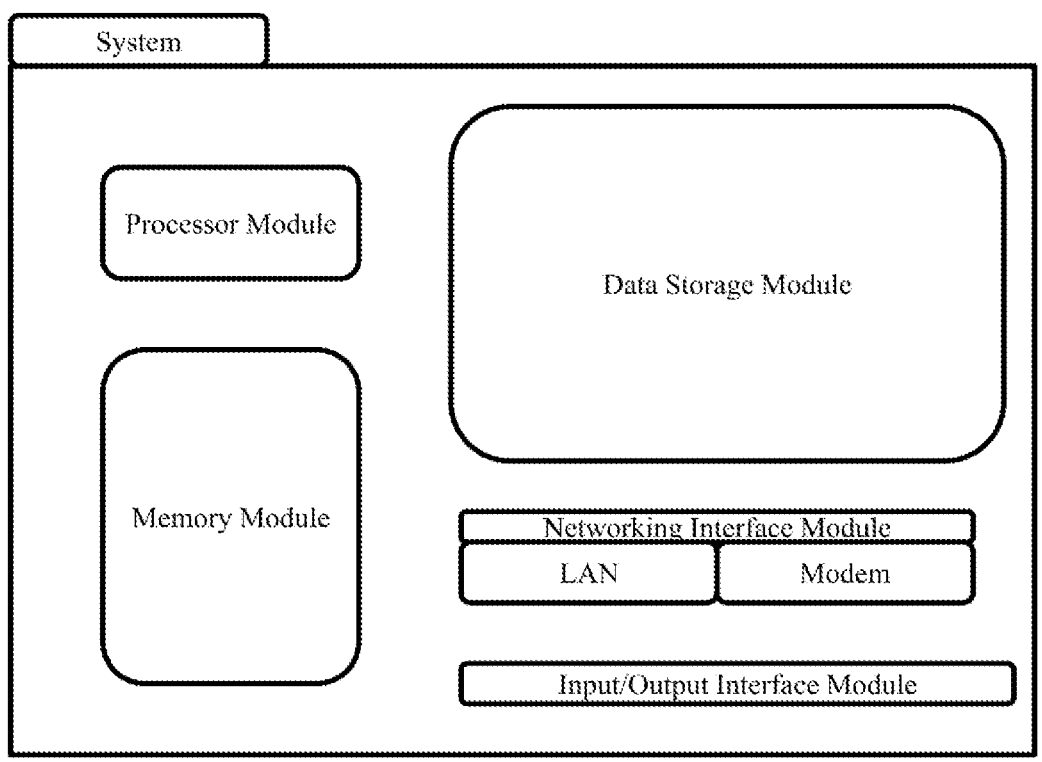
FIG. 1 is a block diagram schematically showing a system according to some embodiments of the present invention.

FIG. 1 is a block diagram schematically showing a system according to some embodiments of the present invention. As shown, the system may comprise at least one processing module, one or more data storage modules coupled to the one or more processing module and at least one memory module coupled to the one or more processing modules. The system may further include a networking interface, to allow the system to operate in a networked environment supporting connections to one or more remote computers, such as mobile devices and computing devices. The networking interface may include a modem and a local area network (LAN) interface. The modem and LAN interface may connect to external communication devices, such as mobile phone, computer system and laptops etc. via internet, WAN or other communication modes.

The memory module may be configured to store software used by the system such as an operating system, applications program and associated database. The memory module may further be configured to store instructions, executable by the processing module, for enabling the system to perform various functions.

The system may also include an input-output interface which may include, but not limited to, an interface for display, keyboard, mouse, keypad, speaker, haptic device, microphone, camera or other input-output techniques well known in the art.

Figure 2:
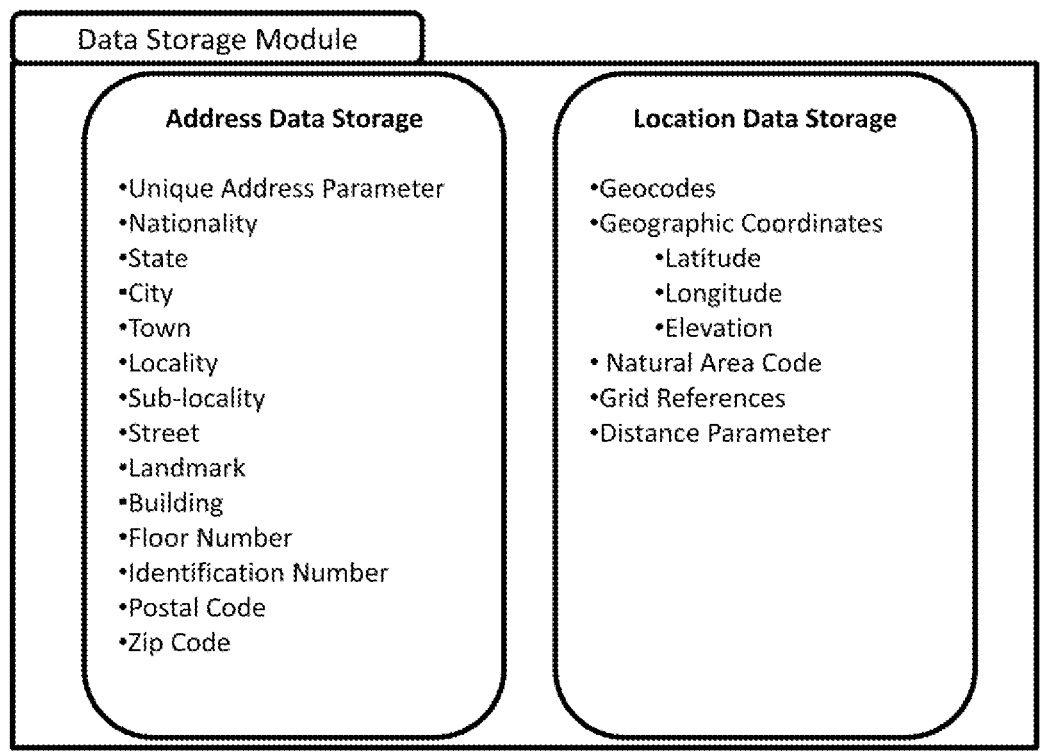
FIG. 2 illustrates a data storage module according to some embodiments of the present invention.

Referring the FIG. 2, there is shown a data storage module according to some embodiments of the present invention. The data storage module may be configured to store address data corresponding to an address of an entity. The address data may include nationality, state, city, town, locality, sub-locality, street, landmark, building, floor number, identification number, postal code, zip code or any other address identifying parameter.

Figure 3:
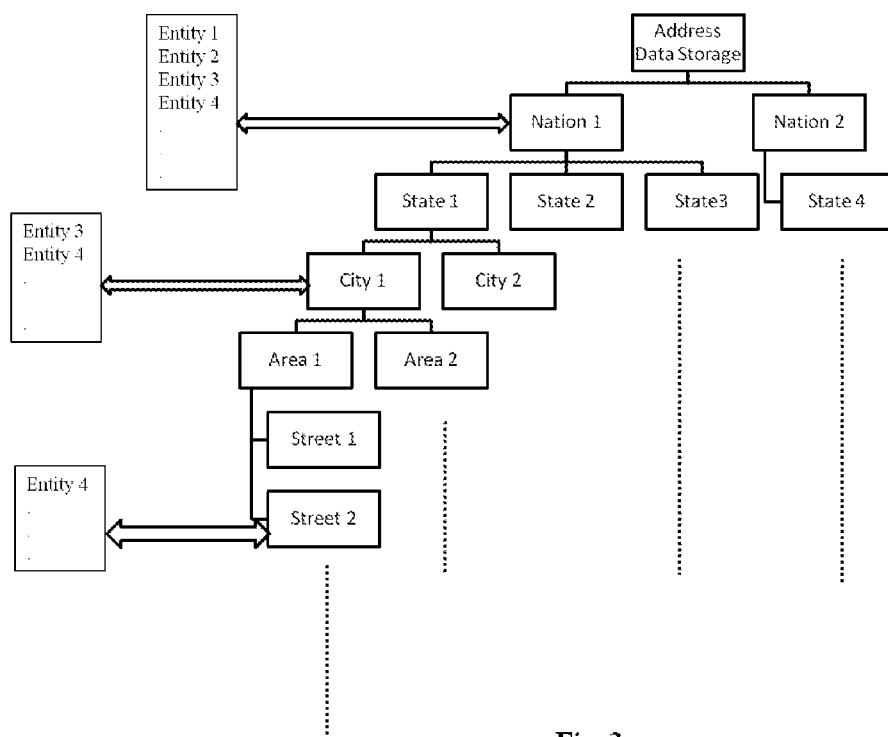
FIG. 3 illustrates a directed acyclic graph corresponding to address data stored in the data storage module according to some embodiments of the present invention.

In an embodiment of the present invention, the storage of address data of entities in the data storage module may be implemented in form of a directed acyclic graph. Referring to FIG. 3, the directed acyclic graph corresponding to address data stored in the data storage module is shown. The graph may include a plurality of hierarchical addressing blocks corresponding to at least one of: nationality, state, city, town, locality, sub-locality, street, landmark, building, floor number, identification number, postal code, zip code or any other address identifying parameter well known in the art. A first addressing block may be connected to at least one second addressing block via a parent-child relationship.

Each hierarchical addressing block may link to one or more entities whose address data map on to the hierarchical addressing block. Hence, the hierarchical addressing block named 'Delhi' shall list all the entities which have 'Delhi' as city in their address data. Similarly, the hierarchical addressing block named 'Janpath' shall list all the entities which have 'Janpath' as street name in their address data.

In an embodiment of the present invention, the data storage module, as shown in FIG. 2, may further be configured to store a unique address parameter corresponding to at least one address of at least one entity. The unique address parameter identifies an entity based on at least one address of the entity. An entity may have more than one address, which may occur due to a number of reasons. As an example, different persons may write the same address differently. In an instance, while writing an address, one person may include landmark details while the other does not or there may be spelling differences, intentional or unintentional. This induces complexity and the uniqueness of the address is lost or diminished.

Hence, the unique address parameter corresponds to at least one such address of an entity. In one embodiment of the present invention, the system may be able to identify two different addresses as belonging to the same entity. In such a case, the unique address parameter may correspond to more than one address of the same entity, as will be shown in greater detail later.

The data storage module may also be configured to store location data corresponding to an entity. The location data may include geocodes, geographic coordinates such as latitude, longitude or elevation, natural area code, grid references, or the like. The location data may further include a distance parameter. The distance parameter along with geographical co-ordinates reflects a probabilistic area, with centre as the geographical co-ordinate and the radius as the distance parameter, which contains the exact location of the entity. Hence, the distance parameter is reflective of the error in the knowledge of location of the entity. Therefore, a larger distance parameter translates to a larger radius, which is interpreted as less preciseness in identifying the location of the entity.

Referring now to FIG. 4, there is shown a unique address parameter system, according to one embodiment of the present invention.

A first unique address parameter of a first entity is selected by the processing module in accordance with the instructions stored in the memory module. The unique address parameter of the first entity may be allotted by the processing module according to an address data received by the processing module from a remote communication device (not shown) in real time or it may be pre-stored in data storage module. The processing module selects a first address data corresponding to the first unique address parameter.

Consider the following first address data for the first entity:

HN-2134, ABC Enclave, PQR Colony, Sector 91, Gurgaon 122505, Haryana

The processing module may identify a plurality of hierarchical addressing blocks from the first address data of the first entity. The hierarchical addressing blocks may typically be: Country1, State1, City1, Locality1, Sub-Locality1, Street1, Building1, House-Number1 and so on.

The identification of plurality of hierarchical addressing block may be performed using data processing techniques such as, but not limited to, machine learning, artificial intelligence, fuzzy learning, pattern matching or other techniques known in the art.

Hence, in the above example, the following hierarchical addressing blocks can be identified from the address data:
State: Haryana
City: Gurgaon
Locality: Sector 91
Sub-Locality: PQR Colony
Building: ABC Enclave
House Number: 2134

The processing module may select at least one addressing block from the list of the addressing blocks stored as the directed acyclic graph in the data storage module. The processing module may select the addressing block based on the plurality of addressing blocks identified from the address data of the first entity. Hence, the processing module may select the addressing block corresponding to City 1, or Locality 1 or Building 1 and so on. The processor may select the addressing block based on rules such as, but not limited to, addressing block having lower hierarchy in the directed acyclic graph, addressing block having linkage to maximum number of entities or having linkage to maximum number of entities whose distance parameters are lower than a threshold limit or any combination thereof. The processor may also select the addressing block randomly.

Hence, in the continuing example, the following addressing block can be selected:

Sub-Locality: PQR Colony

The processing module may be instructed to select at least one second unique address parameter for a second entity corresponding to the addressing block selected by the processing module. The second entity may be selected randomly, or based on rules such as, but not limited to, entity having distance parameter lower than a threshold limit, entity which may serve as a landmark (a monument or the like) or any combination thereof. The second entity may also be selected randomly. The processing module selects a second address data corresponding to the second unique address parameter.

In continuation with the above example, the processing module selects one second entity from the list of entities whose address data incorporate the hierarchical addressing block as Sub-Locality: PQR Colony. Hence, a second entity may be chosen which has the following address data:

325, DEF Society, JKL Street, PQR Colony, Sec-91, Gurgaon

The processing module may compare at least portions of the first address data and the second address data and generate a similarity score between the two address data. To compare the address data, the processing module may convert the second address data into a second set of hierarchical addressing blocks. The processing module may select the complete address data for any of the first and second address data for comparison. Preferably, the processing module selects limited portions of the first and second address data. More preferably, the processing module selects only those portions of the first and second address data which are lower in hierarchy than the addressing block selected above.

In the above example, the processing module converts the address data of the second entity into the following hierarchical addressing blocks:

City: Gurgaon
Locality: Sector 91
Sub-Locality: PQR Colony
Street Name: JKL Street
Building: DEF Society
House Number: 325

Now, given that the selected hierarchical addressing blocks was Sub-Locality: PQR Colony, the processing module selects only those hierarchical addressing blocks of the first and second address data which are lower in hierarchy from the selected hierarchical addressing block.

Hence, the processing module may select the following portions of the first and second address data for comparison:

for first address data: HN-2134, ABC Enclave
for second address data: #325, DEF Society, JKL Street The processing module may, then, generate a similarity score based on the comparison between the first and the second address data. The processing module may employ string comparison techniques, such as string metric, fuzzy searching, phonetic comparison, concept searching, semantic searching or other techniques well known in the art. The similarity score reflects the similarity between the selected portions of the first and second address data. Hence, if the two address portions are very similar to each other, for example only differing in house numbers, then the similarity score between the two is higher.

The processing module updates the first unique address parameter based on the generated similarity score. If the generated similarity score is above a threshold value, then it may be adjudged that the first address data and the second address data are same. In such a case, the processing module may update the first unique address parameter to be same as the second unique address parameter. If the generated similarity score is below a threshold value, the processing module may update the first unique address parameter to be different from the second unique address parameter.

The processing module may repeat the above procedure by selecting a third entity, a fourth entity, and so on.

The disclosure is operational with numerous other general purpose or special purpose computing system environments or configurations. Examples of well known computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, and distributed computing environments that include any of the above systems or devices, and the like.

As used herein, the wording "entity" means any geographical area which may include, but not limited to, buildings, structures, monuments, open areas such as parks, grounds, forests.

We claim:

1. A system comprising:
one or more processing modules;
one or more data storage modules, operatively coupled to the one or more processing modules, wherein the one or more data storage modules are configured to store at least one of:
an address data corresponding to an address of at least one entity;
wherein the address data is stored in form of hierarchical addressing blocks, corresponding to at least one of: nationality, state, city, town, locality, sub-locality, street, landmark, building, floor number, postal code, zip code and identification number; and
a unique address parameter corresponding to at least one address of at least one entity;
at least one memory module operatively coupled to the one or more processing modules, wherein the at least one memory module stores instructions which, when executed by the one or more processing modules, causes the one or more processing modules to,
select, from the one or more data storage modules, a first address data corresponding to an address of a first entity;
convert the first address data into a first set of hierarchical addressing blocks;
select, from the first set of hierarchical addressing blocks, at least one hierarchical addressing block;
select, from the one or more data storage modules, a second address data corresponding to an address of a second entity, based on the selected at least one hierarchical addressing block;
compare at least a portion of the first address data with at least a portion of the second address data, to generate a similarity score; and
update a first unique address parameter of the first address data corresponding to the generated similarity score, wherein the first unique address parameter of the first address data is different from a second unique address parameter of the second address data when the generated similarity score is lower than a threshold.

2. The system of claim 1, wherein the one or more processing modules is further configured to convert the second address data into a second set of hierarchical addressing blocks.

3. The system of claim 2, wherein to generate the similarity score, only those portions of the first and second address data are compared which are lower in hierarchy than the selected at least one hierarchical addressing block.

4. The system of claim 1, wherein the first unique address parameter of the first address data is equal to a second unique address parameter of the second address data when the generated similarity score is above a threshold.

5. A method of generating a unique address parameter corresponding to a first address data of a first entity, the method comprising:
    converting the first address data into a first set of hierarchical addressing blocks;
    selecting, from the first set of hierarchical addressing blocks, at least one hierarchical addressing block;
    selecting a second address data corresponding to an address of a second entity, based on the selected at least one hierarchical addressing block;
    comparing at least a portion of the first address data with at least a portion of the second address data, to generate a similarity score;
    updating a first unique address parameter of the first address data corresponding to the generated similarity score;
    converting the second address data into a second set of hierarchical addressing blocks;
    matching the first set of hierarchical addressing blocks with the second set of hierarchical addressing blocks to identify a first set of unmatched hierarchical addressing blocks and a second set of unmatched hierarchical addressing blocks;
    comparing the first set of unmatched hierarchical addressing blocks with the second set of unmatched hierarchical addressing blocks; and
    generating the similarity score based on said comparison.

6. The method of claim 5, wherein to generate the similarity score, only those portions of the first and second address data are compared which are lower in hierarchy than the selected at least one hierarchical addressing block.

* * * * *